(12) United States Patent
Muma et al.

(10) Patent No.: US 8,854,963 B1
(45) Date of Patent: Oct. 7, 2014

(54) CONTROL AND COORDINATION OF ODUFLEX BANDWIDTH RESIZING OPERATION

(75) Inventors: Scott Muma, Coquitlam (CA); Winston Ki-Cheong Mok, Vancouver (CA); Steven Scott Gorshe, Beaverton, OR (US); Karl Scheffer, North Vancouver (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 193 days.

(21) Appl. No.: 13/466,679

(22) Filed: May 8, 2012

(51) Int. Cl.
*H04B 10/27* (2013.01)

(52) U.S. Cl.
CPC .................................... *H04B 10/27* (2013.01)
USPC ....................................................... 370/231

(58) Field of Classification Search
USPC ......... 370/231, 233, 234, 235, 419, 498, 476, 370/389, 465, 540, 543, 505
See application file for complete search history.

(56) References Cited

U.S. PATENT DOCUMENTS

| | | | | |
|---|---|---|---|---|
| 8,149,706 B2* | 4/2012 | Turlington et al. | ............ | 370/233 |
| 8,363,670 B2* | 1/2013 | Ellegard | .................... | 370/419 |
| 8,514,881 B2* | 8/2013 | Kisaka et al. | ................... | 370/465 |

OTHER PUBLICATIONS

Frazier et al., IEEE 802.3 for LAG, Apr. 17, 2007, Ottawa, Canada, 13 pages.
ITU-T Recommendation G.7042 for LCAS, HAO standard from Mar. 2006, 38 pages.
Wu (Editor), "Draft Recommendation G.7044", wd33r4, Shenzhen, May 2011, 27 pages.
Wu (Editor), "Draft Recommendation G.7044 ITU-T G.7044 (for consent)", Geneva, Feb. 2011, 27 pages.
ITU-T Recommendation G.798, Characteristics of optical transport network hierarchy equipment functional block. Generic Framing Procedure (GFP) protocol defined in ITU-T Recommendation G.7041 (G.7041), Oct. 2010, 356 pages.
ITU-T Recommendation G.7044IY.1347, Hitless adjustment of ODUflex(GFP), Oct. 2011, 44 pages.
ITU-T Recommendation ITU-T G.709/Y.1331, Interfaces for the Optical Transport Network (OTN), Dec. 2009, 218 pages.
Huawei, PMC and China Mobile (Editors), "WD24—Proposed solution for ODUflex BWR buffer fill issue during HAO"—May 16-20 ITU-T Q11/15 interim meeting, 6 pages.
ITU-T COM 15—C1574—"Hitless Adjustment to ODUflex(GFP) (HAO) Performance Parameters During Bandwidth Resizing (BWR)"—Latency Based Approach, Dec. 2011, 4 pages.
ITU-T COM 15—C1577—Hitless Adjustment to ODUflex(GFP) (HAO) Performance Parameters During Bandwidth Resizing (BWR)—Measurement Time References, Dec. 2011, 4 pages.
IEEE 802.3 (2005) Information technology—Telecommunications and information exchange between systems—Local and metropolitan area networks—Specific requirements—Part 3: Carrier sense multiple access with collision detection (CSMA/CD) access method and physical layer specifications, 3rd printing version of Jun. 2010, 315 pages.

(Continued)

*Primary Examiner* — Chi Pham
*Assistant Examiner* — Alexander O Boakye
(74) *Attorney, Agent, or Firm* — Dennis R. Haszko (57) ABSTRACT

Methods and systems are provided for controlling elements in a signal path of a communication network to accommodate changes in the rate of a client signal. In particular, during the bandwidth resizing (BWR) portion of ITU-T Recommendation G.7044 Hitless Adjustment of ODUflex(GFP) protocol (HAO), the nodes in the chain along the ODUflex(GFP) signal path change their output rates in parallel such that FIFO over/underflow is avoided in the nodes. Certain embodiments provide mechanisms to synchronize and stabilize the nodes in a verifiable manner.

19 Claims, 7 Drawing Sheets

(56) References Cited

OTHER PUBLICATIONS

ITU-T Recommendation G.7042/Y.1305 (2001), Link capacity adjustment scheme (LCAS) for virtual concatenated signals, Mar. 2006, 38 pages.

Gorshe et al., "Further Considerations and Analysis Regarding the Rate of G.hao Resizing and Network Stability", Geneva, Feb. 14-25, 2011, 6 pages.

* cited by examiner

Figure 1

Tributary Slot (TS) arrangement example for OPUk (k = 2 or 3)

Figure 1A

Example for a client signal using Tributary Slots 1, 2, 8, 10, &15

CONTROL AND COORDINATION OF ODUFLEX BANDWIDTH RESIZING OPERATION

FIELD

The present disclosure relates generally to telecommunications. More particularly, the present disclosure relates to methods and systems for controlling the operation of nodes in a communication network to accommodate signal rate changes.

BACKGROUND

In a communications network such as the Optical Transport Network (OTN) defined in ITU-T Recommendation G.709 (G.709), which is hereby incorporated by reference herein, data is transmitted in a variety of types of client signals which are in turn transmitted in structured data units. G.709 specifies a number of Optical Data Unit (ODU) signals which all have the same frame format. One type of ODU signal is an ODUflex signal.

ODUflex signals use the same frame format as all ODU signals of the Optical Transport Network (OTN) defined in G.709. The payload carried by an ODUflex(GFP) signal is a stream of packets that have been encapsulated using the Generic Framing Procedure (GFP) protocol defined in ITU-T Recommendation G.7041 (G.7041), which is hereby incorporated by reference herein.

Figure 1:
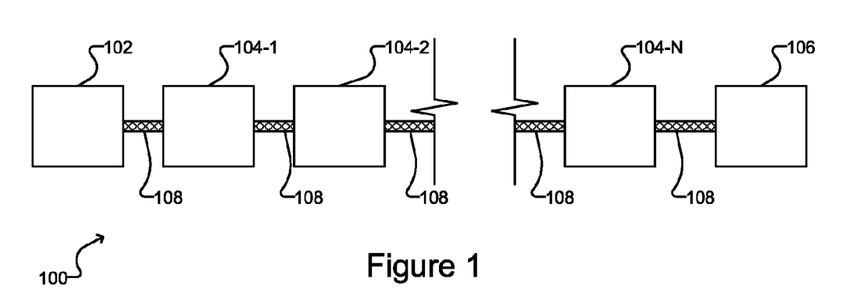
FIG. 1 schematically illustrates an example signal path in a communications network.
Figure 1A:
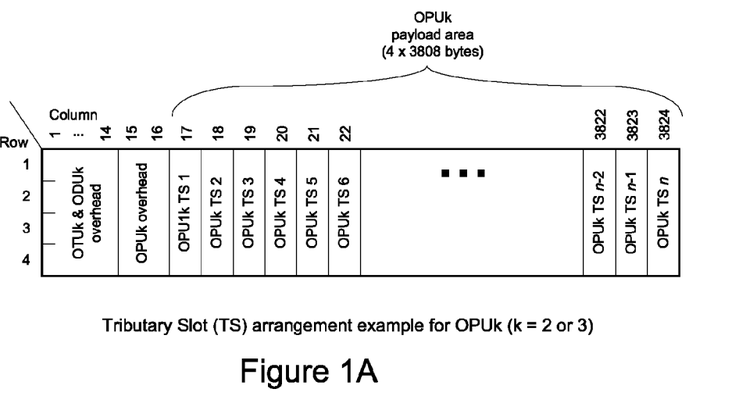
FIG. 1A schematically illustrates an example tributary slot arrangement for a HO OPU.
Figure 1B:
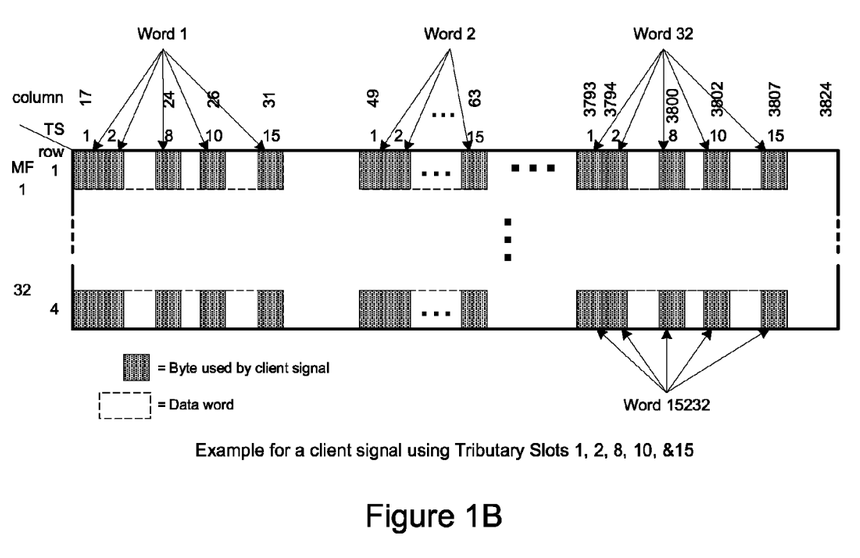
FIG. 1B schematically illustrates an example client signal using tributary slots 1, 2, 8, 10 and 15.

With reference to FIG. 1, which illustrates an example signal path 100 in the OTN, a source node 102 generates a client signal (such as, for example, an ODUflex(GFP) signal) which is transported through a plurality of intermediate nodes 104 (individually labeled 104-1 to 104-N) to a sink node 106 over a plurality of links 108. ODUflex(GFP) and other lower order signals are configured to be carried over links 108 between nodes in the OTN by High Order ODUk (HO ODUk) signals. A plurality of ODUflex signals (and other lower order signals) may be multiplexed into a single HO ODUk signal. A HO ODUk signal has a payload area (referred to as a HO Optical Payload Unit (HO OPU)) comprising one or more lower order signals, and an overhead area. At each intermediate node 104, HO ODUk signals received from an input link 108 are demultiplexed and the lower order signals are buffered before being multiplexed into HO ODUk signals output onto an output link 108. The payload area of a HO ODUk signal comprises a plurality of tributary slots (not shown in FIG. 1, see FIGS. 1A-1E), in which the lower order signals are sent. Each tributary slot has a rate of roughly 1.25 Gbit/s, although the exact rate depends on the rate of the HO ODUk signal. FIG. 1A shows an example tributary slot arrangement within a HO OPUk, where k=2 or 3. In general, the payload area of a HO OPUk is divided into n tributary slots arranged in a repeating pattern. Each tributary slot (TS) occupies one column of the payload area. FIG. 1B shows an example of a client signal using tributary slots 1, 2, 8 10 and 15.

ODUflex(GFP) signals are specified to have a normally constant bit rate selected to correspond to an integer multiple of the rate of a single tributary slot. There are 80 nominal ODUflex(GFP) signal rates defined in G.709, corresponding to the number of tributary slots that the ODUflex(GFP) signal occupies within the payload area of the High Order ODUk (HO ODUk) signal that carries it.

The Generic Multiplexing Procedure (GMP) used in the OTN provides a count of the number of data words to be transmitted in the next multi-frame (MF) of the HO ODUk signal. In this case, the data words being transmitted within the HO OPU (Optical Payload Unit) payload area channel is an ODUflex signal.

ITU-T Recommendation G.7044 (G.7044), which is hereby incorporated by reference herein, specifies a protocol for changing the rates of ODUflex(GFP) signals, referred to as the Hitless Adjustment of ODUflex(GFP) (HAO) protocol. The HAO protocol provides a mechanism for changing both the number of tributary slots occupied by an ODUflex(GFP) signal, and the rate of the of ODUflex(GFP) signal itself in order to appropriately fill that number of tributary slots. Changing the ODUflex(GFP) signal rate changes its capacity to carry the GFP-encapsulated client packet data frames. The HAO protocol consists of two parts. One part of the HAO protocol is a Link Capacity Resizing (LCR) protocol. LCR provides a per-link handshake mechanism that allows the nodes on each end of the link to synchronize a change in the number of tributary slots being used for a given ODUflex (GFP) signal. The synchronization allows the change in the number of tributary slots to occur with no impact on the ODUflex(GFP) client signal.

The other part of the HAO protocol is the bandwidth resizing (BWR) protocol. BWR changes the rate of the ODUflex (GFP) signal to fit within the new number of tributary slots. The ODUflex(GFP) signal rate change during BWR is achieved by changing the GMP count of the data words to be transmitted in the next multi-frame of the High Order ODU signal. The GMP mechanism thus allows a convenient mechanism for increasing or decreasing the ODUflex(GFP) signal rate. The rate change is spread out in time in order to allow all nodes along the path to adjust to the new rate gradually. In the case of a bandwidth increase, the LCR protocol completes before the BWR protocol begins. In other words, at the completion of the LCR protocol, the ODUflex(GFP) signal rate remains unchanged, but it occupies a different number of tributary slots. In a bandwidth decrease case, the order is partially reversed. The nodes on each link go through an initial LCR set-up so that they are prepared to pass the BWR signaling. Then the BWR protocol reduces the ODUflex (GFP) signal rate to fit the desired reduced number of tributary slots. Once the ODUflex(GFP) signal rate is appropriate for the smaller number of tributary slots, the LCR protocol completes the action by removing the tributary slots that are targeted for removal.

Figure 1C:
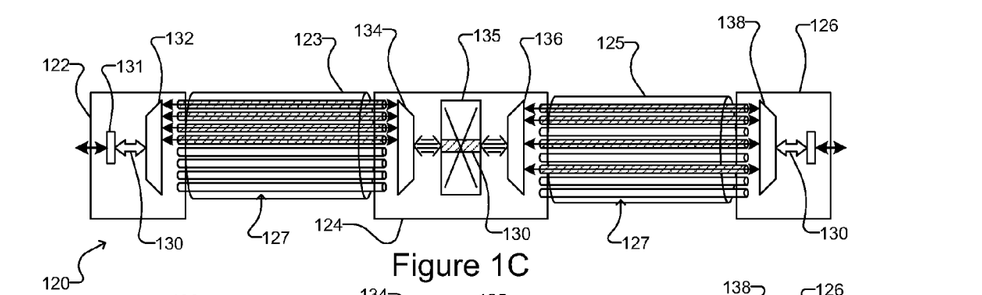
FIG. 1C shows a more detailed view of another example signal path in an optical transport network carrying an example ODUflex(GFP) client signal.
Figure 1D:
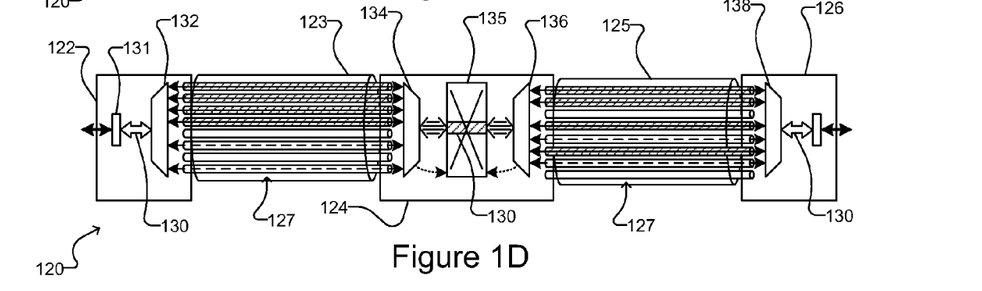
FIG. 1D illustrates operation of an example Hitless Adjustment of ODUflex (HAO) protocol applied to the ODUflex (GFP) client signal on the signal path of FIG. 1A.
Figure 1E:
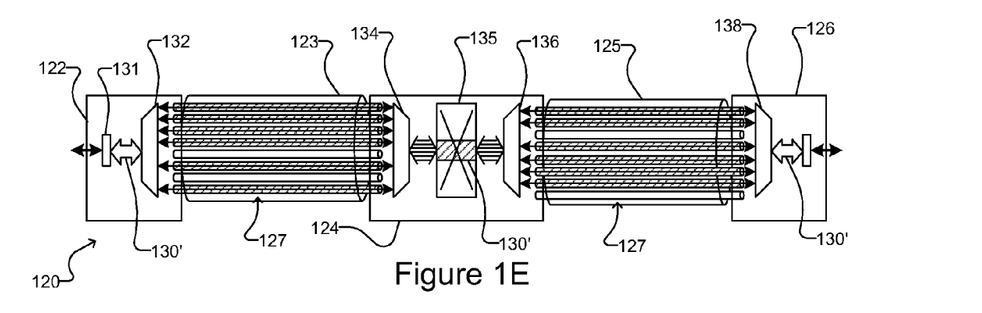
FIG. 1E shows the ODUflex(GFP) client signal on the signal path of FIG. 1A after completion of the HAO protocol.

The HAO operation is illustrated in a summary manner in FIGS. 1C-E for a bandwidth increase case. FIGS. 1C-E show an example signal path 120 comprising a source node 122 which sends signals through a first link 123 to an intermediate node 124, which in turn sends signals through a second link 125 to a sink node 126. Each of first and second links 123 and 125 comprise a plurality of tributary slots 127.

An ODUflex client signal 130 (which may, for example, be an ODUflex(GFP) signal) is generated by a signal source 131 at source node 122, multiplexed into a HO ODUk signal by an interface 132 and transmitted through link 123 within four tributary slots 127 of the payload area of the HO ODUk signal. At intermediate node 124 the client signal 130 is then demultiplexed at interface 134 and passed through a switching fabric 135 to an interface 136 which multiplexes the client signal back into a HO ODUk signal for transmission over link 125. Intermediate node 124 comprises buffers (not shown) between switching fabric 135 and each of interfaces 134 and 136, and may also comprise other elements as known in the art, such as, for example, framer circuits (or "framers") to recover signal alignment, multiplexers and demultiplexers, internal clocks, clock smoothing circuits (e.g. phase locked loops), and circuits to remove, insert and/or monitor the HO ODUk overhead information.

The LCR protocol is used on each link to change the number of tributary slots 127 used by the client signal 130. FIG. 1D illustrates that the LCR protocol is used to establish the connection for client signal through the two additional tributary slots 127, as indicated by the dashed double-headed arrows. The additional tributary slots 127 are used to transmit client signal 130 as its rate is increased during the BWR protocol. FIG. 1E shows the resulting use of all six tributary slots by an increased rate client signal 130' after the BWR protocol operation.

The HAO protocol thus provides a convenient mechanism for changing the rate of an ODUflex client signal. However, as explained further below, depending on the number of intermediate nodes in a signal path and the type of changes to the rate of the ODUflex client signal, the nodes further down the signal path may experience problems due to over or under filling of their buffers. The inventors have identified a need for improved methods and systems for changing the rate of normally constant client signals such as ODUflex client signals.

There are a number of prior art proposals aimed at resolving this problem with the HAO protocol, which may be summarized as follows:

One proposal was to restrict the allowed number of intermediate nodes so that BWR can complete with reasonable stability in a reasonable timeframe. This proposal would have the advantage of not requiring any change in the relevant protocols, but would impose an additional network management burden, and may be overly limiting in terms of the total number of intermediate nodes allowed. Also, under such a proposal it would be difficult to specify the node requirements such that deterministic network behavior can be achieved.

Another proposal was to add signaling overhead to the HO OPU HAO overhead to indicate a step change in the rate and buffer stability at the transmitting node, and use the OPUflex overhead for the sink to inform the source of a stable connection that is now ready for the next step. This proposal has a number of advantages, in that it would provide guaranteed, deterministic network behavior, it would accommodate any number of intermediate nodes, and the signaling used to implement this proposal would remain at the layers already processed by source, sink, and intermediate nodes. However, this proposal would add more overhead than other approaches, would require that a "stability" determination at each node be defined, and may require more time to complete the BWR protocol as compared to other approaches. Also, this proposal would require a mechanism to communicate the step change event from the ingress line card to the egress line card at each node.

Another proposal was to add signaling overhead to the HO OPU HAO overhead to indicate a step change in the rate, and restrict the response of intermediate nodes. This approach would advantageously require only minimal new signaling overhead, and the signaling would remain at the layers already processed by source, sink, and intermediate nodes. However, this proposal would require a long enough time between rate steps for a meaningful random hold off, and network behavior would not be deterministic under this proposal. Also, this proposal would require a mechanism to communicate the step change event from the ingress line card to the egress line card at each node.

Another proposal was to add signaling to the OPUflex HAO overhead to indicate when a rate change step has been initiated by the source. Advantages of this proposal include fast flow-through of the step indication, which allows all intermediate nodes to adjust at virtually the same time, and minimization of the cascading/magnifying of the problem at subsequent nodes. However, this proposal would require intermediate nodes to process LO OPU overhead at their egress ports, and the nodes are still just reacting to the incoming signal rate. Also, further study would be needed to determine whether there could be problems with such an approach in a signal path with a large number of nodes.

Another proposal was to use normal mode filtering with to restrict the rate of rate change at each node to less than 300 steps per second, with a step size of one GMP increment (which is equal to one data word; e.g. N-bytes for an ODU signal using N tributary slots). This approach could result in some simplification to the HAO protocol by removing the GMP special mode filter change. However, this approach would increase the buffer requirements at each intermediate node (due to the filtering causing a slow egress response to the ingress rate change), and also may be slower than the other approaches. Also, this approach was found to not work during subsequent network simulations. In general, Phase Locked Loops (PLLs) can successfully track a frequency ramp with zero offset, but introduce a delay when given an abrupt start to a ramp, which can lead to the problem identified above.

The inventors have thus identified a need for improved methods and systems for changing the rate of normally constant bit rate client signals such as ODUflex client signals. The inventors have identified a particular need for improved methods and systems for changing the rate of the ODUflex (GFP) signal during the HAO protocol.

The HAO protocol is unique relative to other protocols for adjusting signal rates as known in the art. The most fundamentally unique aspect of HAO relative to other rate adjustment protocols is the existence of an intermediate bearer signal, which is the ODUflex(GFP) signal. Other rate adjustment protocols operate on the basis of packets being mapped (with or without some encapsulation protocol) directly into a Layer 1 channel. These protocols address either packet transmission rate of the data mapped into that channel, or the size of the Layer 1 channel. For example, the Link Capacity Adjustment Scheme (LCAS) defined in ITU-T Recommendation G.7042/Y.1305 (2001), which is hereby incorporated by reference herein, is used to change the size of a Layer 1 channel's capacity in a manner that causes no hits or disruptions to the packet data stream being carried within that channel. The LCAS is similar to the HAO LCR protocol, except that LCAS is more complex due to its other protocol requirements. Specifically, LCAS supports channels that consist of tributary slots on multiple different Layer 1 signals that can be routed on different Layer 1 paths through the network (similar to Link capacity adjustment within the IEEE 802.3 Link Aggregation (LAG) Protocol). However, an ODUflex signal requires that all the tributary slots be contained within the same signal on each link as it transits a network. There is no intermediate bearer signal with LCAS that would be analogous to the ODUflex(GFP). The GFP-encapsulated packets are mapped directly into the channel controlled by LCAS. The HAO protocol is different in that a nominally constant bit rate (CBR) OTN signal is defined (i.e., the ODUflex(GFP) signal), and the packets are first mapped into the payload portion of that intermediate signal. Then, this intermediate ODUflex(GFP) signal is time division multiplexed (TDM) into the payload area of a higher rate server signal (i.e., the HO ODUk). General packet stream rate adjustment protocols adjust the rate of packet transmission by simply varying the number of Idle characters sent between data packets. The LAG protocol allows an Ethernet stream to be divided and transmitted in parallel over multiple physical links, but does not provide a mechanism for changing the number of links in a hitless manner, nor does it allow an intermediate carrier (i.e., like an ODUflex signal) that is mapped into the links to smoothly and hitlessly ramp its rate. Also, the LAG protocol only affects how packets are mapped directly into the aggregate set of available links. No other protocol defines an intermediate container signal that is then multiplexed using TDM into a higher rate Layer 1 signal. The HAO protocol was developed as a mechanism to change the rate of this intermediate container signal to fill the capacity of a different sized Layer 1 channel (i.e., fill a different number of tributary slots within a HO ODUk server signal.)

There have been a number of prior art attempts at determining whether or not a node is behaving such that it will not cause problems for downstream nodes. The prior art attempted to specify the performance of nodes based on either (A) frequency domain methods (similar to the specifications for jitter and wander on a constant bit rate signal in ITU-T Recommendation G.8251 (G.8251), which is hereby incorporated by reference herein) or (B) by a bound on the changes in buffer fill at each node, or by a combination of these parameters.

(A) The jitter/wander type of approach has the following drawbacks:

While jitter and wander are relatively easy to measure as short-term phase/frequency variations of a fixed rate signal, it becomes much more complex to measure the equivalent aspects of a signal that is changing its rate. Here, the test equipment would need to measure the short term variations in the rate at which the ODUflex(GFP) signal rate is changing rather than in the ODUflex(GFP) signal rate itself.

There are scenarios in which a jitter/wander type approach would not guarantee stability. For example, the output rate change from a give node may be very stable, however if its rate change is too different from the next node (i.e., there is too much difference between the slope of the frequency change between the two nodes), the downstream node may still not be able to maintain its own output ramp stability without experiencing buffer underflow or overflow.

(B) The buffer stability type of approach has the following four drawbacks.

First, at a high level, buffer hysteresis is not necessarily relevant to the network performance. Specifically, a given node's buffer hysteresis does not directly impact the protocol unless that node reacts to the associated buffer fill in a manner that forces excessive buffer hysteresis at a downstream node.

Second, a buffer hysteresis approach is extremely implementation-dependent. For example, since many device and system implementations contain multiple buffers at different points in the datapath, the determination of the buffer hysteresis is not straightforward to either determine or specify.

The third problem is that, since buffer fill and buffer hysteresis are internal device/system states, it is impossible to test the system to verify compliance with a buffer-hysteresis specification. The method for specifying the stability of the ramp rate must be testable (and hence measurable) at the edges of a network element rather than requiring internal state knowledge of the network element.

The fourth issue with using hysteresis is that hysteresis is best used for a parameter that nominally has a steady state rather than a state that is changing. In order to understand this issue, consider the following example of a 1 km fiber. The amount data that resides within a fiber is the data rate divided by the light propagation rate, multiplied by the fiber length. When an ODUflex uses a single tributary slot, a 1 km fiber contains approximately $(1.25 \times 10^9 \text{ bit/s})(1 \text{ s}/2 \times 10^8 \text{ m})(1 \times 10^3 \text{ m})$=6250 bits. If that ODUflex rate is increased to using eight tributary slots, then that fiber would contain approximately 50000 bits. The increased number of bits contained in the fiber is inherent due to the fiber having a non-zero propagation delay, and it has no impact on the downstream equipment. A node is analogous to a piece of fiber in that the amount of data in its buffers for a given ODUflex signal is inherently proportional to the rate of that ODUflex signal. Consequently, a first order hysteresis specification is not directly applicable during the BWR protocol.

The inventors have thus identified a need for improved methods and systems for changing the rate of normally constant bit rate client signals such as ODUflex client signals wherein the performance of nodes may be tested to verify compliance with specified performance characteristics.

SUMMARY

One aspect provides a method of changing the rate of a client signal having a normally constant bit rate in order to fill an available server signal payload channel bandwidth in a signal path comprising a source node and a sink node, and at least one intermediate node between the source node and the sink node. The method comprises sending a rate change indication signal from the source node along the signal path in order to coordinate a beginning of the rate change at all nodes in the signal path, the rate change indication signal being carried in an overhead area of the client signal, at the source node, after sending the rate change indication signal, changing an output rate of the client signal at a nominal rate of change, and, at each intermediate node, in response to the rate change indication signal, changing the output rate of the client signal at the nominal rate of change.

Another aspect provides a method of controlling a source node transmitting a normally constant bit rate client signal through a signal path to change the rate of the normally constant bit rate client signal, the signal path comprising a plurality of intermediate nodes and a sink node connected by a plurality of links. The method comprises sending a link resizing signal along the signal path to reconfigure the plurality of links to change an available bandwidth for the client signal, receiving a notification that the signal path is ready for a bandwidth change, sending a rate change indication signal along the signal path in order to coordinate a beginning of the rate change at all nodes in the signal path, the rate change indication signal being carried in an overhead area of the client signal, and, ramping the rate of the normally constant bit rate client signal at a nominal rate of change.

Another aspect provides a method of controlling an intermediate node in a signal path between a source node and a sink node, the source node transmitting a normally constant bit rate client signal along the signal path which has been multiplexed into a high order signal. The method comprises receiving and demultiplexing the high order signal to obtain the normally constant bit rate client signal, recovering a frame alignment of the normally constant bit rate client signal, extracting a rate change indication signal from an overhead area of the normally constant bit rate client signal, and, in response to the rate change indication signal, changing an output rate of the client signal at a nominal rate of change.

Another aspect provides a method of controlling an intermediate server layer node when changing a rate of a normally constant bit rate client signal in order to fill an available bandwidth of a server signal payload channel. The method comprises measuring a transit latency of the client signal between an input and an output of the intermediate server layer node, and, maintaining the transit latency of the client signal within a predetermined range of a nominal reference latency.

Another aspect provides a node in a communication network comprising an input interface configured to receive an incoming high order signal and demultiplex the high order signal into one or more lower order signals, at least one of the one or more lower order signals comprising a normally constant bit rate client signal that is in the process of changing to a different rate, an output interface configured to multiplex one or more lower order signals into an outgoing high order signal, an input buffer configured to receive one or more lower order signals from the input interface, an output buffer configured to provide one or more lower order signals to the output interface, a switching fabric configured to receive one or more lower order signals from the input buffer and provide one or more lower order signals to the output buffer, a framing circuit configured to recover a frame alignment of the normally constant bit rate client signal and extract a rate change indication signal from an overhead of the normally constant bit rate client signal, an output clock generator circuit configured to control an output rate at which the normally constant bit rate client signal is multiplexed into the outgoing high order signal, and, a rate adjustment mechanism for measuring a transit latency of the client signal through the node and adjusting the output rate to maintain the transit latency within a predetermined range of a nominal reference latency.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides methods and systems for controlling elements in a signal path of a communication network to accommodate changes in the rate of a client signal. Example embodiments are described herein in the context of an optical transport network (OTN) wherein a client signal, namely an ODUflex(GFP) signal, is undergoing a rate increase, but it is to be understood that the techniques described herein may also be applied to accommodate decreases in rate of a client signal, and may also be applied in other contexts. Also, while the example embodiments described herein contemplate substantially constant rates of rate change, typically in stepwise fashion, it is to be understood that the techniques described herein may be also applied to any types of rate changes, including varying rates of rate changes.

As used herein, the term "ramp" is used to refer to a period during which the rate of a signal is changing. Likewise, the expression "start of the ramp" and similar expressions are used to refer to the onset of a change in rate of a client signal, and the expression "ramp rate" and similar expressions are used to refer to the rate at which the rate of a signal is changing.

Problem Statement

In normal operation, a phase locked loop (PLL) is used to limit the amount of jitter and wander that an ODUflex(GFP) signal will incur as it is multiplexed into and removed from a HO ODUk signal. The normal PLL filter must be disabled in order to allow an adequately fast reaction to the rate change during BWR. However, the inventors have determined that as each node reacts to the incoming change without filtering, the magnitude of the change seen by downstream nodes can be amplified such that eventually nodes further down the chain will experience FIFO over/underflow. Experiments show that filtering and rate change limits were not adequate to prevent problems. Consider the following example of a bandwidth increase case with L=1 at the first intermediate node, with the source node increasing $C_m$ nominally once every multi-frame, where:

$C_m$=the rate of a client signal;
$C_m i$=the initial value of the $C_m$ at the beginning of the BWR protocol; and,
L=the latency (in multi-frames) between when an intermediate node receives the changing $C_m$ at the ingress port and when the node adjusts the $C_m$ on the egress port in the same direction.

In the first multi-frame, the incoming stream goes from $C_m i$ to $C_m i+1$, and the outgoing stream initially remains at $C_m i$ due to its 1 multi-frame reaction latency. As a result, the node's buffer or "FIFO" depth increases by one word.

In the second multi-frame, the incoming stream goes to $C_m i+2$, and the outgoing stream goes to $C_m i+1$. The node's FIFO depth again increases by one word. If the intermediate node continues to increment its outgoing $C_m$ by +1, its FIFO depth will continue to increase by one word each multi-frame since there is always one more word coming in than it sends out. In other words the incoming $C_m=C_m i+n$ and outgoing $C_m=C_m i+n-1$ in the $n^{th}$ multi-frame, and n words have accumulated in the FIFO.

The intermediate node could increment the outgoing $C_m$ by +2 to clear the extra words from its FIFO and eventually have the incoming and outgoing $C_m$ values be equal. Clearly, the sooner it would do this, the better. However, assuming that the second intermediate node has the same latency as the first intermediate node, if the first intermediate node uses +2 increments, the second intermediate node would have the same FIFO increase issue, but now it is compounded when the second node starts to receive the +2 increments. Thus, if the second node has a latency of 1 in responding to the incoming +2 increments, its FIFO depth would increase by 2 words each multi-frame.

This increasing FIFO depth in the buffers continues through the entire signal path at each successive intermediate node. As a result, the FIFO buffer size requirements increase at each node in the chain, and are difficult to bound.

As noted above, while this example is an extreme case (i.e., having the source ramp the $C_m$ value by 1 per multi-frame), the same stability problem can occur even with ramps that use relatively infrequent $C_m$ increments (or decrements). The problem is analogous to a 'snake dance' or 'crack the whip game' where the node reactions to each step can become amplified as the change ripples through the chain, resulting in wide buffer fill level swings at nodes further downstream.

Technical Solutions and Example Embodiments

One way to avoid buffer stability problems in a chain of nodes is to limit the amount to which each given node needs to react to the incoming ODUflex(GFP) rate in adjusting its output ODUflex(GFP)rate. Certain embodiments of the invention provide methods and systems whereby all nodes in a signal path adjust (ramp) their output ODUflex(GFP) rates in parallel at the same nominal rate. "Nominal" here means that all nodes use a local clock to derive their output ODUflex (GFP) signal rate. Ideally, each node would have an identical output rate at each snapshot in time, however, clock implementation and clock tolerance differences will typically cause a small degree of clock rate differences between the nodes.

If the nodes start their clock rate ramp at significantly different times, a buffer stability issue may still arise as nodes attempt to catch up or hold back their own output rate in order to track the incoming rate. Consequently, all nodes should begin their local output clock ramp at close to the same time. Certain embodiments address this synchronization by using a signal to explicitly indicate the start of the ramp. Specifically, certain embodiments use a signal in the overhead of the ODUflex(GFP) signal rather than overhead of the HO OPUk signals. This rate change indication signal is sometimes referred to as the bandwidth resize indicator (BWR_IND) signal.

Figure 2:
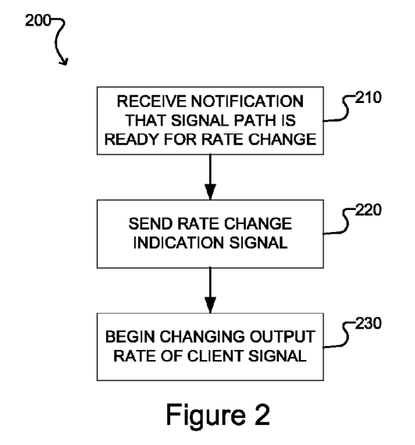
FIG. 2 is a flowchart illustrating an example method carried out on a source node according to one embodiment.

FIG. 2 shows an example method 200 carried out on a source node according to one embodiment. Method 200 begins at block 210, where the source node receives a notification that the signal path is ready for a rate change of a client signal (such as, for example, the ODUflex(GFP) signal). In the context of a bandwidth increase in the HAO protocol, block 210 may comprise the source node receiving an indication that the LCR protocol is complete and that the capacity of the links between nodes in the signal path have been resized. (Similarly, in a bandwidth decrease case block 210 may comprise receiving an indication that the initial LCR set-up is complete and the links are ready for bandwidth resizing.) After receiving the notification, at block 220 the source node sends a rate change indication signal, such as for example, the bandwidth resize indicator (BWR_IND) signal, to the other nodes in the signal path. After sending the rate change indication signal, at block 230 the source node begins changing the rate of the client signal.

A technical hurdle which must be overcome in order to use the ODUflex(GFP) signal overhead is that intermediate nodes typically do not use or determine the content of ODUflex (GFP) signal overhead, but instead just pass ODUflex(GFP) signals along the signal path. This drawback is what made using the ODUflex(GFP) overhead a non-obvious choice. The advantage, however, is that the ODUflex(GFP) signal propagates through each node with a minimum of delay. Hence all nodes will see the rate change indications at effectively the same time. Accordingly, certain embodiments provide methods and systems whereby each intermediate node extracts the ODUflex(GFP) signal overhead with new framer circuits to recover the frame alignment of the ODUflex(GFP) signal in order to identify the location of the ODUflex(GFP) signal overhead and extract this overhead.

The ODUflex client signal propagation delay through each node (and through the interconnecting fibers) means that the nodes don't see the rate change indication signal at the same time relative to a universal clock. However, any rate change would incur essentially the same propagation delay. Consequently, each node "sees" rate change indication signal at the same time offset relative to when the data with the changed rate arrives. In other words, each node should see effectively the same period of time difference between when it sees the rate change indication signal and when it sees the beginning of the rate ramp.

Figure 3:
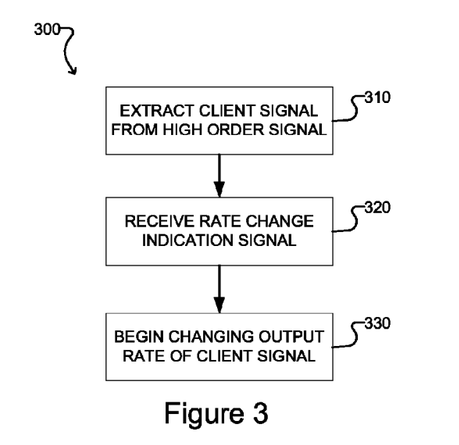
FIG. 3 is a flowchart illustrating an example method carried out on an intermediate node according to one embodiment.

FIG. 3 shows an example method 300 carried out on an intermediate node according to one embodiment. Method 300 begins at block 310, where the intermediate node extracts a lower order client signal (such as, for example, the ODUflex (GFP) signal) from a high order signal (such as, for example, the HO ODUk signal). At block 320 the intermediate node receives a rate change indication signal from the overhead of the client signal indicating that the rate of the client signal is about to begin changing. In some embodiments, the intermediate node is configured to determine a target rate from the new number of tributary slots to be used, as specified in the initial set-up of the LCR protocol when the intermediate node is provisioned. In some embodiments, the intermediate node is explicitly provided with the target rate when it is provisioned. In some embodiments, the rate change indication signal is asserted as "true" by the source node to coordinate the beginning of the rate change, and the rate change indication signal is reset to "false" by the source node to signal the end of the rate change. At block 330 the intermediate node begins changing the output rate of the client signal in response to the rate change indication signal.

Due to differences in clock implementations and the inherent frequency tolerance range of oscillators, there will be very small differences in the rate at which each node ramps its output ODUflex rate. Over time, a node will need to send one more or one fewer data words of its output ODUflex signal in the output HO ODUk signal in order to track with the incoming ODUflex signal rate. This adjustment is made using the normal GMP adjustment mechanism. Since the parallel ramping insures that adjustments are small and far apart in time, no buffer stability problems will occur.

Figure 3A:
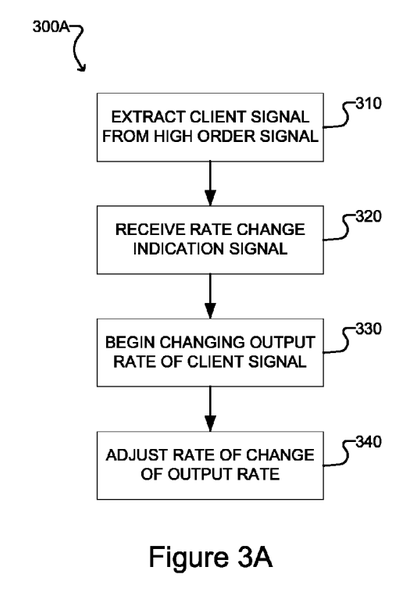
FIG. 3A is a flowchart illustrating an example method carried out on an intermediate node according to another embodiment.

FIG. 3A shows an example method 300A carried out on an intermediate node according to one embodiment. Blocks 310, 320 and 330 of method 300A are the same as method 300 discussed above and will not be described again. Method 300A also comprises block 340, at which the intermediate node adjusts the rate of change of the output rate of the client signal. In some embodiments, the node adjusts the rate of change of the output rate using the GMP. In some embodiments, the node determines whether to make adjustments to its output steps based on the amount of data that currently resides in the buffers of that node. If the buffers are becoming too full, the node will need to increase the amount of client signal data (e.g., ODUflex(GFP) data) it outputs relative to the nominal rate change (e.g., increase the output rate slightly faster during a HAO bandwidth increase case or decrease the rate slightly slower during a HAO bandwidth decrease case). If the buffers are not full enough, the node will need to decrease the amount of client signal data (e.g., ODUflex (GFP) data) it outputs relative to the nominal rate change (e.g., decrease the output rate slightly slower during a HAO bandwidth increase case or increase the rate slightly faster during a HAO bandwidth decrease case). In some embodiments, the amount of data in the buffers of the node is estimated using time measurements, as described further below, since the latency between the node's input and output ports is proportional to the amount of data that resides in the node's buffers. In some embodiments, tracking of the ODUflex (GFP) signal rate at the input and output of the node is determined using input/output frequency measurement techniques.

Figure 3B:
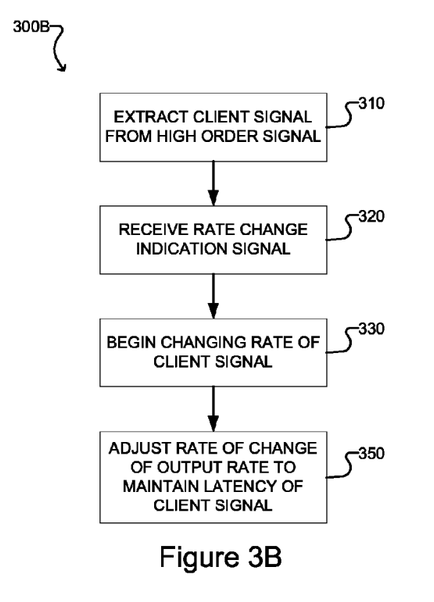
FIG. 3B is a flowchart illustrating an example method carried out on an intermediate node according to another embodiment.

FIG. 3B shows an example method 300B carried out on an intermediate node according to one embodiment. Blocks 310, 320 and 330 of method 300B are the same as method 300 discussed above and will not be described again. Method 300B comprises block 350, at which the intermediate node adjusts the rate of change of the output rate of the client signal to maintain the latency of the client signal. In some embodiments, as discussed further below with respect to FIGS. 7 and 8, block 350 in method 300B may comprise packetizing the client signal and placing a time stamp on each packet at an ingress card of the node, and reading the time stamps on the packets at an egress card of the node to determine latency.

Figure 4:
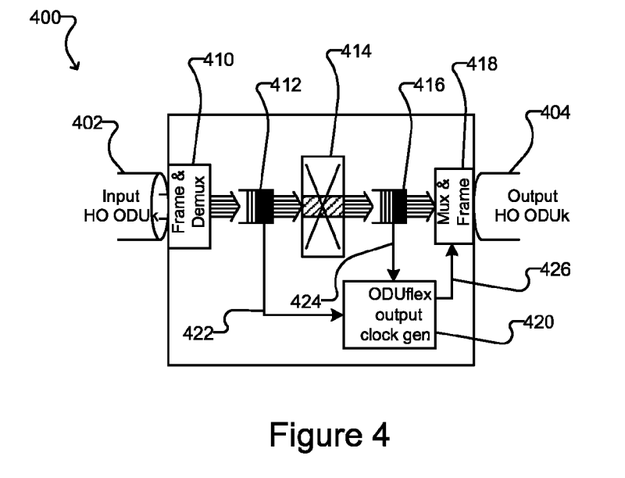
FIG. 4 schematically illustrates an example intermediate node according to one embodiment.

An example intermediate node 400 according to one embodiment is illustrated in FIG. 4. Node 400 has an input 402 for receiving an incoming high order signal (such as, for example, a HO ODUk signal), and an output 404 for transmitting an outgoing high order signal. A framing and demultiplexing circuit 410 extracts a client signal (such as, for example, an ODUflex(GFP) signal) form the incoming high order signal and recovers the frame alignment of the client signal. The client signal is then passed through an input buffer 412, a switching fabric 414 and an output buffer 416 to a multiplexing and framing circuit 418. Multiplexing and framing circuit 418 multiplexes the client signal back into the outgoing high order signal transmitted from output 404.

Node 400 comprises an output clock generator circuit 420 which controls the rate at which the client signal is transmitted in the high order signal sent from output 404. In particular, output clock generator circuit 420 receives an input buffer fill level signal 422 from input buffer 412 and an output buffer fill level signal 424 from output buffer 416, and generates an output rate adjustment signal 426 based on the fill level signals 422 and 424 to control the rate at which multiplexing and framing circuit 418 outputs the client signal. In some embodiments, output clock generator circuit 420 receives other types of signals (either in addition to or instead of fill level signals 422 and 424) from input and output buffers 412 and 416, such as, for example relative input/output rate information signals or the like. In some embodiments, the signals provided to output clock generator circuit 420 are filtered to prevent circuit 420 from reacting too quickly, as discussed further below.

Figure 5A:
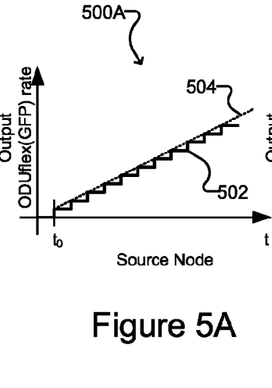
FIG. 5A is a graph showing changes in the output rate of an example source node over time.
Figure 5B:
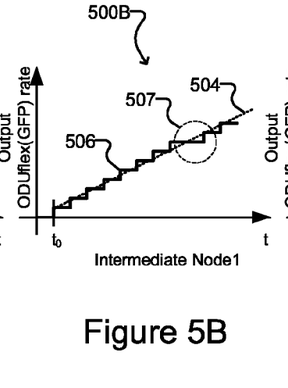
FIG. 5B is a graph showing changes in the output rate of an example intermediate node with a fast local clock over time.
Figure 5C:
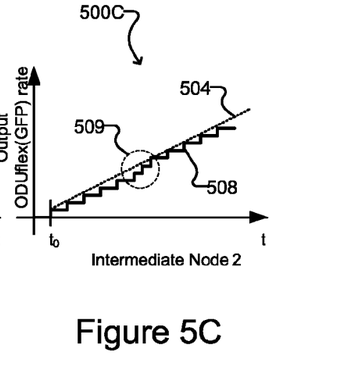
FIG. 5C is a graph showing changes in the output rate of an example intermediate node with a slow local clock over time.

The output rate adjustment aspects of certain embodiments are illustrated in FIGS. 5A-C, which respectively show graphs 500A, 500B and 500C of example output rates of an ODUflex(GFP) client signal over time from a source node (FIG. 5A) and two intermediate nodes (Intermediate Nodes 1 and 2 in FIGS. 5B and 5C, respectively). In a communications network such as the OTN, nodes use the GMP to control the rate of the ODUflex(GFP) signal, which results in steps rather than a continuous increase of the ODUflex(GFP) signal rate in the output HO ODUk. The step size is one data word per approximately n multi-frames of the HO ODUk signal. (The G.7044 standard specifies a nominal rate change of 512 Mbit/$s^2$, which does not directly correspond to a step every "n" multi-frames where "n" is an integer.) Since the source node is the master for the rate change, it will increase the ODUflex (GFP) signal rate in steady steps (indicated by trace 502) corresponding to a nominal rate of increase of 512 Mbits/$s^2$ in the illustrated example, which is indicated by dotted line 504 in each of FIGS. 5A-C. In the illustration, the local clock of Intermediate Node 1, shown in FIG. 5B, is running slightly faster than that of the source node, as indicated by trace 506 which over time creeps ahead of the nominal rate line 504. Consequently, Intermediate Node 1 will occasionally need to delay increasing its output rate (e.g. by incrementing its output GMP value), as shown in circle 507. In contrast, Intermediate Node 2 has a local clock slightly slower than the source node, as indicated by trace 508 in FIG. 5C which over time falls behind the nominal rate line 504. Consequently Intermediate Node 2 will occasionally need to make an additional rate increase (e.g. an additional GMP increment step), as shown in circle 509. The parallel output rate ramping by all the nodes keeps these adjustments infrequent enough that downstream nodes have no problems accommodating them. Referring to FIG. 4, the buffer fill, relative input/output rate information, and/or other signals provided to output clock generator circuit 420 are filtered so that circuit 420 does not react too quickly, hence ensuring that any rate slope adjustments will be spread out in time.

Latency-based Approach for Ramp Rate Stability Specification

As noted above, some embodiments provide methods and systems whereby nodes adjust the rate of change of the output rate of a client signal to maintain a constant signal transit latency for the ODUflex signal as it passes through each node. Such embodiments advantageously readily allow verification of the stability of the rate change.

In order to maintain a stable ramp rate along the signal path, each node should effectively behave the same as if it was a length of fiber. Consider the example of a node that tries to maintain exactly the same number of bytes in its internal buffers during a bandwidth increase. Since the number of bytes that transit the node are increasing, maintaining the same number of bytes in its buffers will mean that the number of (M+N byte) data words in its buffers at the final rate will be substantially less than the number of (M byte) data words in its buffers at the original rate. The opposite scenario exists for the bandwidth decrease case. Maintaining a fixed latency across the node guarantees that the number of words in the node's buffers (i.e., the FIFO depth) is essentially the same for both the old and new rates.

Figure 6:
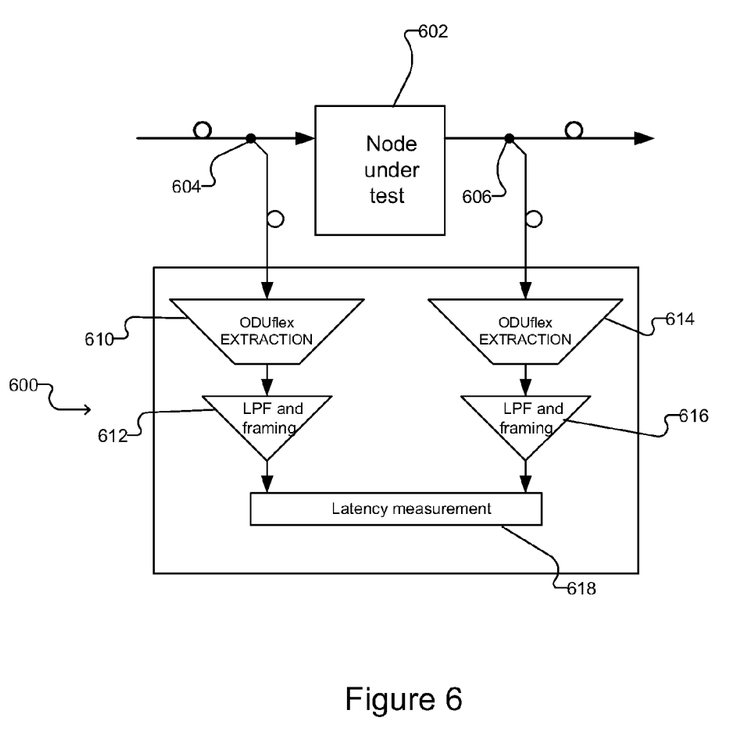
FIG. 6 schematically illustrates example test equipment for measuring latency at a node according to one embodiment.

A latency-based specification is straightforward to measure with equipment that is external to the node. FIG. 6 shows an example test apparatus 600 according to one embodiment for testing the performance of a node 602. Apparatus 600 is coupled to monitor the incoming and outgoing signals (e.g., an input HO ODUk signal and an output HO ODUk signal, each of which are carrying an ODUflex signal) at junctions 604 and 606 (e.g., via fiber taps) on the input and output sides of node 602. Apparatus 600 comprises ODUflex extraction circuits 610 and 614 for extracting the ODUflex signal from the respective HO ODUk signals, and low pass filtering (LPF) and framing circuits 612 and 616 for filtering the ODUflex signals and recovering their frame alignments. In some embodiments, the ODUflex signals are smoothed with a 300 Hz filter by circuits 612 and 616. Apparatus 600 also comprises a latency measurement circuit which compares the latency between the ODUflex signals extracted from the incoming and outgoing HO ODUk signals. In some embodiments, the test apparatus 600 is configured to measure the average latency and the peak variation of this latency relative to an average that existed before the beginning of the rate change (which may be referred to as the "nominal reference latency"). For a variety of reasons, it would not be practical to measure the latency based on the position of the ODUflex bits within the respective incoming and outgoing HO ODUk multi-frames.

In some embodiments, nodes are configured to measure the nominal reference latency and adjust their output rates to maintain this latency. There are two potential points at which the nominal reference latency measurement could be made:
1. At the beginning of HAO, before LCR is initiated
2. At the point where the node enters GMP Special Mode.

When a node is in "GMP Special Mode" it relaxes its PLL constraints in order to be able to track the ramping rate of the ODUflex(GFP) signal. In other words, during GMP Special Mode, a node no longer attempts to constrain the ODUflex (GFP) signal to conform to the ITU-T Recommendation G.8251 jitter and wander requirements associated with a CBR signal.

While there are some minor variations on these reference point choices, these appear to be the two best candidates. The first option has the virtue of maintaining the latency relative to the initial condition of the node prior to implementation of the HAO protocol. However, it makes designs much more difficult, especially in case of the bandwidth increase. Depending on the node's architecture, it may need to buffer more data or less data to support the new tributary slot count through its fabric. For example, if a node was buffering X bytes of an ODUflex signal using a single tributary slot, if the increase is to use >X bytes, the node would not have enough data in its buffers to hold even a single word. If built up very slowly, this amount of phase change to support FIFO depth requirements can have no impact on the downstream nodes. We would need to define the parameter for "very slowly" in order to prevent problems for the downstream chain of nodes. Since the node's transit latency changes during this adjustment, there is also the potential that this variation could overlap with the BWR period, which would further complicate the latency variation measurement specification.

Using the entrance into GMP Special mode as the latency reference point has two advantages. First, prior to entering GMP Special Mode, a node is still constrained by G.8251 for its wander limits. If the LCR FIFO adjustments are made during the GMP Normal Mode, then they are guaranteed to be slow enough to not impact downstream nodes. When a node begins LCR, it can immediately begin adjusting its fabric and FIFOs so that it is stable prior to entering GMP Special Mode.

The inventors have determined that the second alternative is preferred. For a variety of reasons, it is better to have the reference measurement made at the point where handoff occurs between the two governing signal stability specifications (i.e., G.8251 and G.7044). Accordingly, in certain embodiments the nominal reference latency measurement is made at the time in which the node enters GMP Special mode.

Some embodiments exploit an increasingly common architecture of OTN equipment. The traffic that is added or dropped (or switched) within an OTN Add/Drop Multiplexing node (ADM) has become a mix of CBR and packet data streams. While these ADMs can use separate packet and TDM (Time Division Multiplexing) fabrics for the two types of traffic, there are many advantages to using a single fabric to support both types of client traffic. Since the amount of packet traffic is growing, there has been a trend to use a packet switching fabric as the common fabric for both packet and CBR data streams. In order to send a CBR data signal through a fabric, the signal must first be segmented into packets on the ingress line card. These packets are then re-assembled into a CBR signal at the egress line card. This type of node architecture is illustrated in FIG. 7.

Figure 7:
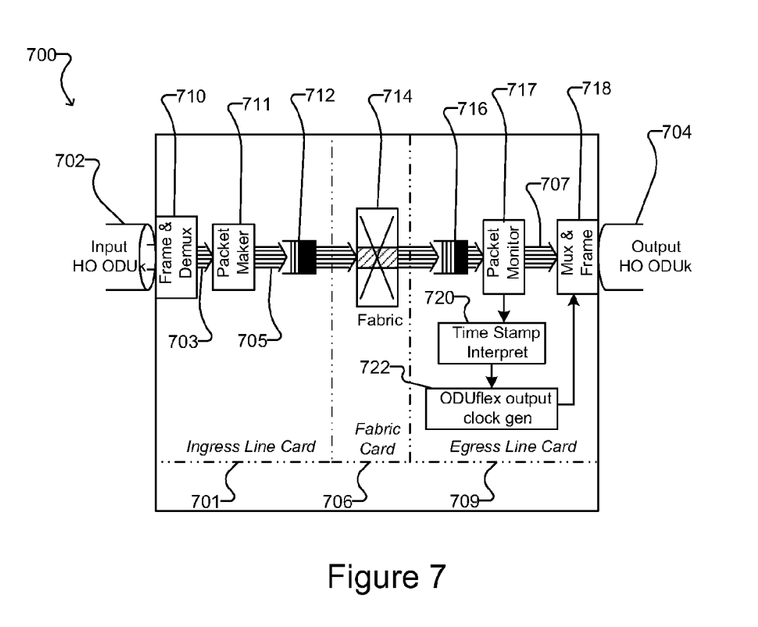
FIG. 7 schematically illustrates an example intermediate node according to one embodiment.

FIG. 7 shows an example node 700 according to an example embodiment. Node 700 has an input 702 for receiving an incoming high order signal (such as, for example, a HO ODUk signal), and an output 704 for transmitting an outgoing high order signal. A framing and demultiplexing circuit 710 extracts a client signal (such as, for example, an ODUflex (GFP) signal) form the incoming high order signal and recovers the frame alignment of the client signal. The extracted and framed client signal 703 is then packetized and time stamped by a packet maker 711 to generate a packetized signal 705. The packetized signal 705 is passed through an input buffer 712, a switching fabric 714 and an output buffer 716 to a packet monitor 717. Packet monitor 717 reassembles the packetized signal into a CBR signal 707 which is provided to a multiplexing and framing circuit 718. Multiplexing and framing circuit 718 multiplexes the client signal back into the outgoing high order signal transmitted from output 704.

Packet monitor 717 also monitors the time stamps of packetized signal 705 and provides time stamp information to a time stamp interpretation circuit 720. Time stamp interpretation circuit 720 in turn determines a latency of the packetized signal 705, compares this latency to the nominal reference latency (which may be measured by circuit 720 when node 700 enters GMP special mode, as discussed above) and provides the results of the latency comparison to an output clock generator circuit 722 which controls the rate at which the reassembled client signal 707 is transmitted in the high order signal sent from output 704. In particular, time stamp interpretation circuit 720 and output clock generator circuit 722 are configured to adjust the output rate such that it attempts to maintain a constant time stamp "age" for the packets extracted from output buffer 716. In some embodiments, this approach is used for all CBR client signals, not just ODUflex (GFP) signals.

In the illustrated embodiment, framing and demultiplexing circuit 710, packet maker 711 and input buffer 712 are all provided on an ingress line card 701. Likewise, output buffer 716, packet monitor 717, multiplexing and framing circuit 718, time stamp interpretation circuit 720 and output clock generator circuit 722 are all provided on an egress line card 709, which is operably coupled to ingress line card 701 by a fabric card 706 containing switching fabric 714. Other node architectures are also possible.

Figure 8:
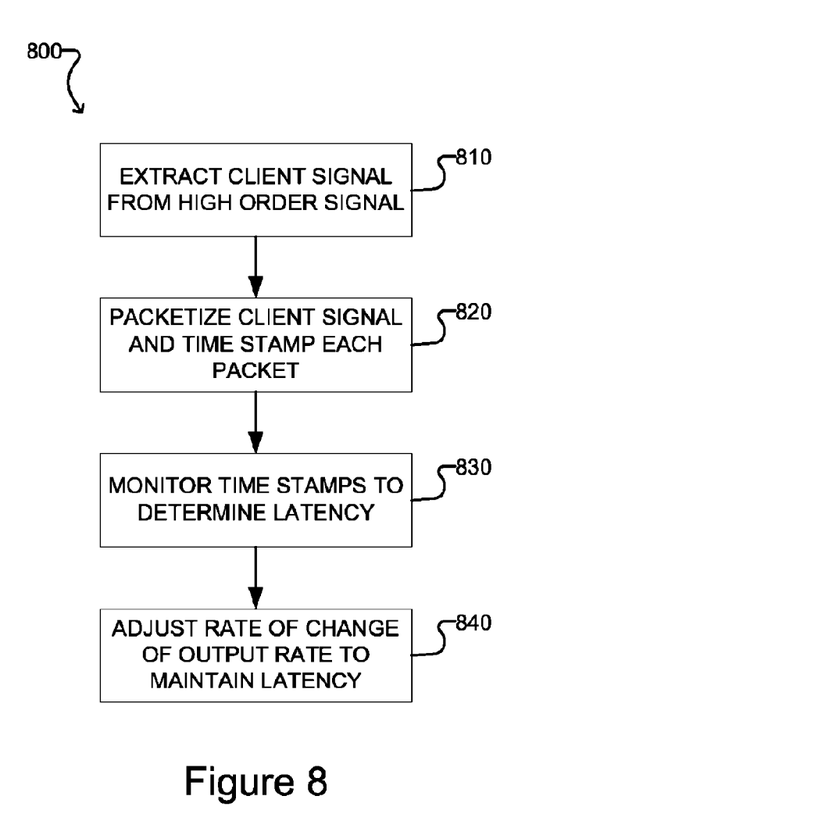
FIG. 8 is a flowchart illustrating an example method carried out on an intermediate node according to one embodiment.

FIG. 8 shows an example method 800 carried out on a node according to one embodiment. At block 810 the node extracts a CBR client signal from a high order signal. At block 820 the node packetizes the client signal and time stamps each packet. At block 830 the node monitors the time stamps to determine the latency of the client signal at the node. At block 840 the node adjusts the output rate of the client signal to maintain the latency of the client signal within a predetermined range of a nominal reference latency. As noted above, the nominal reference latency may be measured when the node enters GMP special mode.

Time stamp approaches as described above are particularly advantageous in certain embodiments in which the primary parameter for node performance is to maintain a constant transit latency through the node. The time stamp approach for CBR signals inherently works to maintain constant transit latency. For example, if the ODUflex(GFP) signal rate is being increased, more packets will be arriving at the egress FIFO buffer, and hence the time stamp difference between successive packets will become smaller. The egress card will see that the age of its packets is increasing as the FIFO buffer fill begins to increase. Consequently, it will increase the output ODUflex(GFP) signal clock rate to maintain the constant time stamp age.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the invention may be implemented using specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device (such as, for example a node of a communications network) may implement methods as described herein by executing software instructions in a program memory accessible to the processors.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, while elements are at times shown as being performed sequentially, they may instead be performed simultaneously or in different sequences. It is therefore intended that the following claims are interpreted to include all such variations as are within their intended scope.

Embodiments of the disclosure can be represented as a computer program product stored in a machine-readable medium (also referred to as a computer-readable medium, a processor-readable medium, or a computer usable medium having a computer-readable program code embodied therein). Program products according to the invention may be in any of a wide variety of forms. The machine-readable medium can be any suitable tangible, non-transitory medium, including magnetic, optical, or electrical storage medium including a diskette, compact disk read only memory (CD-ROM), memory device (volatile or non-volatile), hardwired or preprogrammed chips (e.g., EEPROM semiconductor chips), nanotechnology memory, or similar storage mechanism. The machine-readable medium can contain various sets of instructions, code sequences, configuration information, or other data, which, when executed, cause a processor to perform steps in a method according to an embodiment of the disclosure. The information on the machine-readable medium may optionally be compressed or encrypted. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to one skilled in the art, including variations obtained by: replacing features, elements and/or steps with equivalent features, elements and/or steps; mixing and matching of features, elements and/or steps from different embodiments; combining features, elements and/or steps from embodiments as described herein with features, elements and/or steps of other technology; and/or omitting features, elements and/or steps from described example embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole. The above-described embodiments are intended to be examples only. Alterations, modifications and variations can be effected to the particular embodiments by those of skill in the art without departing from the scope, which is defined solely by the claims appended hereto.

What is claimed is:

1. A method of changing a rate of an ODUflex(GFP) signal having a normally constant bit rate in order to fill an available server signal payload channel bandwidth in a signal path comprising a source node and a sink node, and at least one intermediate node between the source node and the sink node, the method comprising:
   sending a rate change indication signal from the source node along the signal path in order to coordinate a beginning of the rate change at all nodes in the signal path, the rate change indication signal being carried in an overhead area of the ODUflex(GFP) signal;
   at the source node, after sending the rate change indication signal, changing the rate of the ODUflex(GFP) signal from the normally constant bit rate to a new bit rate at a nominal rate of change; and
   at each intermediate node, in response to the rate change indication signal, changing the rate of the ODUflex(GFP) signal from the normally constant bit rate to the new bit rate at the nominal rate of change.

2. The method of claim 1 comprising obtaining a target rate for the client ODUflex(GFP) signal at each intermediate node.

3. The method of claim 2 wherein obtaining the target rate comprises receiving a signal indicating the target rate.

4. The method of claim 2 wherein obtaining the target rate comprises determining the target rate based on a target number of tributary slots to be used for the ODUflex(GFP) signal.

5. The method of claim 2 wherein each intermediate node stops independently changing the rate of the ODUflex(GFP) signal when the new bit rate is equal to the target rate.

6. The method of claim 1 wherein the ODUflex(GFP) signal is multiplexed into a high order signal for transmission over links between the nodes.

7. The method of claim 1 wherein the nominal rate of change is derived from an internal clock at each intermediate node.

8. The method of claim 7 comprising adjusting the new bit rate of each intermediate node to compensate for differences between the internal clock of each intermediate node and an internal clock of the source node.

9. The method of claim 1 wherein the ODUflex(GFP) signal is mapped into a server layer channel comprising a group of one or more tributary slots within the payload area of a high order ODU signal.

10. The method of claim 9 wherein an OTN generic mapping procedure (GMP) is used to indicate the new bit rate of the ODUflex(GFP) signal per multi-frame of the high order ODU signal.

11. The method of claim 10 wherein an output GMP value is adjusted to accommodate differences between internal clocks of the intermediate nodes and an internal clock of the source node.

12. The method of claim 9 wherein the rate change indication signal is carried in an overhead area of the ODUflex(GFP) signal that is undergoing the rate change.

13. The method of claim 12 comprising providing enhanced ODU framers at the intermediate nodes for recognizing the rate change indication signal within the ODUflex(GFP) signal.

14. A method of controlling a source node transmitting an ODUflex(GFP) signal having a normally constant bit rate through a signal path to change a rate of the ODUflex(GFP) signal from the normally constant bit rate to a new bit rate, the signal path comprising a plurality of intermediate nodes and a sink node connected by a plurality of links, the method comprising:
   sending a link resizing signal along the signal path to reconfigure the plurality of links to change an available bandwidth for the ODUflex(GFP) signal;
   receiving a notification that the signal path is ready for a bandwidth change;
   sending a rate change indication signal along the signal path in order to coordinate a beginning of the rate change at all nodes in the signal path, the rate change indication signal being carried in an overhead area of the ODUflex (GFP) signal; and,
   ramping the rate of the ODUflex(GFP) signal from the normally constant bit rate to the new bit rate at a nominal rate of change.

15. A method of controlling an intermediate node in a signal path between a source node and a sink node, the source node transmitting an ODUflex(GFP) signal having a normally constant bit rate along the signal path which has been multiplexed into a high order signal, the method comprising:
   receiving and demultiplexing the high order signal to obtain the ODUflex(GFP) signal;
   recovering a frame alignment of the ODUflex(GFP) signal;
   extracting a rate change indication signal from an overhead area of the ODUflex(GFP) signal; and,
   in response to the rate change indication signal, changing a rate of the ODUflex(GFP) signal from the normally constant bit rate to a new bit rate at a nominal rate of change.

16. A method of controlling an intermediate server layer node when changing a rate of an ODUflex(GFP) signal having a normally constant bit rate to a new bit rate in order to fill an available bandwidth of a server signal payload channel, the method comprising: measuring a transit latency of the ODUflex(GFP) signal between an input and an output of the intermediate server layer node; and, maintaining the transit latency of the ODUflex(GFP) signal within a predetermined range of a nominal reference latency when changing the rate of the ODUflex(GFP) from the normally constant bit rate to the new bit rate; said measuring and said maintaining being in response to both extracting a rate change indication signal from an overhead area of the ODUflex(GFP) signal, and changing a rate of the ODUflex(GFP) signal from the normally constant bit rate to the new bit rate at a nominal rate of change.

17. The method of claim 16 wherein the nominal reference latency is measured as the intermediate server layer node transitions to a mode that can accept a change to the rate of the ODUflex(GFP) signal.

18. A node in a communication network, the node comprising:
   an input interface configured to receive an incoming high order signal and demultiplex the high order signal into one or more lower order signals, at least one of the one or more lower order signals comprising a normally constant bit rate client signal that is in the process of changing to a different rate;
   an output interface configured to multiplex one or more lower order signals into an outgoing high order signal;
   an input buffer configured to receive one or more lower order signals from the input interface;
   an output buffer configured to provide one or more lower order signals to the output interface;
   a switching fabric configured to receive one or more lower order signals from the input buffer and provide one or more lower order signals to the output buffer;
   a framing circuit configured to recover a frame alignment of the normally constant bit rate client signal and extract a rate change indication signal from an overhead of the normally constant bit rate client signal;

an output clock generator circuit configured to control an output rate at which the normally constant bit rate client signal is multiplexed into the outgoing high order signal; and, a rate adjustment mechanism for measuring a transit latency of the client signal through the node and adjusting the output rate to maintain the transit latency within a predetermined range of a nominal reference latency.

19. The node of claim 18 wherein the nominal reference latency is measured as the node transitions to a mode that can accept a changing client signal rate.

* * * * *

UNITED STATES PATENT AND TRADEMARK OFFICE
CERTIFICATE OF CORRECTION

| | | |
|---|---|---|
| PATENT NO. | : 8,854,963 B1 | Page 1 of 1 |
| APPLICATION NO. | : 13/466679 | |
| DATED | : October 7, 2014 | |
| INVENTOR(S) | : Scott Muma et al. | |

It is certified that error appears in the above-identified patent and that said Letters Patent is hereby corrected as shown below:

In the Claims

Column 17, line 22, delete "Client"

Signed and Sealed this
Tenth Day of March, 2015

Michelle K. Lee
*Deputy Director of the United States Patent and Trademark Office*